(12) United States Patent
Piao et al.

(10) Patent No.: US 6,708,517 B1
(45) Date of Patent: Mar. 23, 2004

(54) HEAT PUMP

(75) Inventors: Chun-cheng Piao, Sakai (JP); Manabu Yoshimi, Sakai (JP); Ryuichi Sakamoto, Sakai (JP); Yuji Watanabe, Sakai (JP); Kazuo Yonemoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 109 days.

(21) Appl. No.: 10/069,564

(22) PCT Filed: Aug. 24, 2000

(86) PCT No.: PCT/JP00/05727

§ 371 (c)(1),
(2), (4) Date: Feb. 27, 2002

(87) PCT Pub. No.: WO01/18464

PCT Pub. Date: Mar. 15, 2001

(30) Foreign Application Priority Data

Sep. 3, 1999 (JP) .......................... 11/249735

(51) Int. Cl.$^7$ ................................ F25B 13/00
(52) U.S. Cl. .................................. 62/324.1
(58) Field of Search ...................... 62/324.1, 324.2, 62/532, 534

(56) References Cited

U.S. PATENT DOCUMENTS

| | | | |
|---|---|---|---|
| 1,993,300 A | 3/1935 | Randel | |
| 4,003,213 A | 1/1977 | Cox | |
| 4,301,662 A | 11/1981 | Whitnah | |
| 4,474,031 A | * 10/1984 | Collet | ........................ 62/324.2 |
| 4,795,618 A | 1/1989 | Laumen | |
| 5,209,078 A | 5/1993 | Conrad et al. | |
| 5,351,501 A | 10/1994 | Petersen | |
| 6,414,116 B1 | 7/2002 | Eickmann et al. | |

FOREIGN PATENT DOCUMENTS

| | | | |
|---|---|---|---|
| CH | 221 241 | 5/1942 | |
| DE | 373 915 | 4/1923 | |
| DE | 41 17 944 A1 | 12/1992 | |
| DE | 195 45 335 A1 | 6/1997 | |
| DE | 197 57 769 | 6/1999 | |
| EP | 0 272 069 A2 | 6/1988 | |
| JP | 58-200963 | 11/1983 | |
| JP | 61-87908 | 5/1986 | |
| JP | 62-223573 | 10/1987 | |
| JP | 402004183 A | * 1/1990 | ................ 62/324.1 |
| JP | 2-27581 | 6/1990 | |
| JP | 402287069 A | * 11/1990 | ................ 62/324.1 |
| JP | 05-006105 | 1/1993 | |
| JP | 406039202 A | * 2/1994 | ................ 62/342.1 |
| JP | 07-43039 | 2/1995 | |
| JP | 10-141801 | 5/1998 | |
| JP | 10-185350 | 7/1998 | |

OTHER PUBLICATIONS

European Search Report (Dated Apr. 24, 2003).

* cited by examiner

Primary Examiner—Melvin Jones
(74) Attorney, Agent, or Firm—Nixon Peabody LLP; Donald R. Studebaker

(57) ABSTRACT

A water vapor separating section (20), a compressor (30), and a main heat exchanger (40) are connected in that order to form a cycle system (12). The inside of the water vapor separating section (20) is divided by a water vapor permeable membrane (21) into an air space (22) and a water vapor space (23). A mixture of ventilation exhaust air and outdoor air is delivered, as heat source air, to the water vapor space (23). Water vapor contained in the heat source air passes through the water vapor permeable membrane (21), thereby being separated from the heat source air. The water vapor separated is compressed in the compressor (30) and thereafter delivered to the main heat exchanger (40). In the main heat exchanger (40), the water vapor from the compressor (30) condenses and to-be-heated air in a utilization system (13) is heated by heat of condensation of the water vapor.

20 Claims, 8 Drawing Sheets

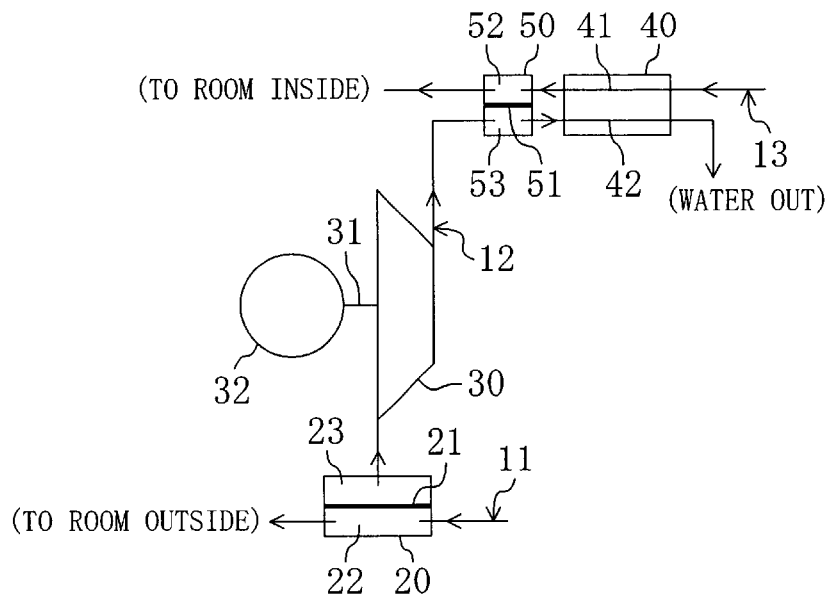
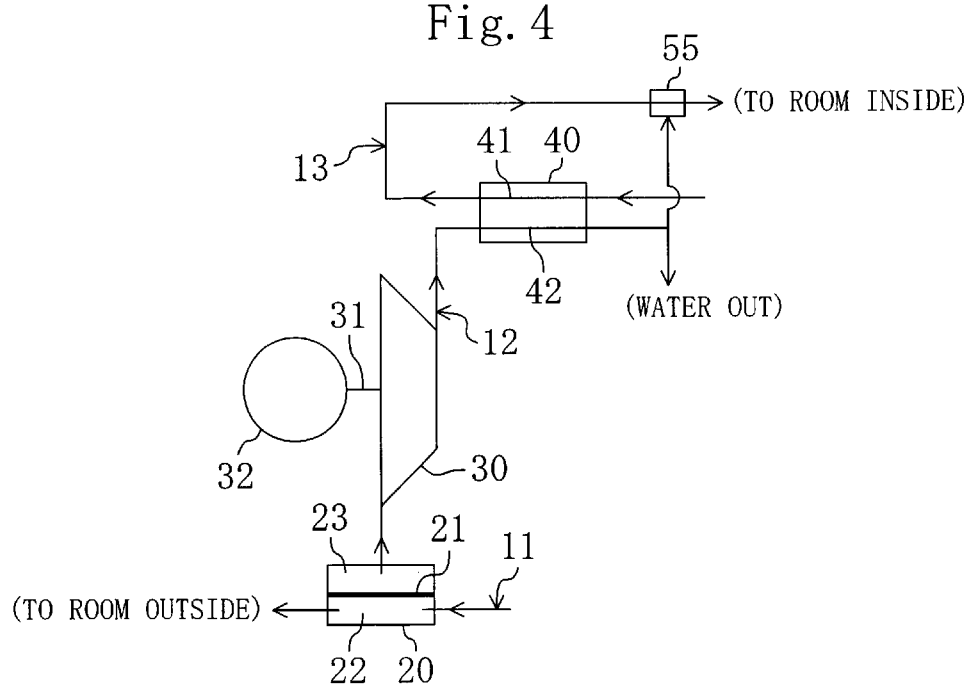

HEAT PUMP

TECHNICAL FIELD

The present invention relates to a heat pump utilizing the heat of condensation of water vapor as hot heat.

BACKGROUND ART

Heat pumps of the type in which water serves as a refrigerant have been known in the past (for example, see Japanese Patent Kokoku Publication No. H05-6105). More specifically, in such a type of heat pump system, water is caused to evaporate in the evaporator; water vapor as a result of the evaporation is compressed; and then the compressed water vapor is directed to the condenser where it is caused to condense, wherein heat of condensation liberated during the condensation is utilized.
Problems that the Invention Intends to Solve As stated above, there exists, in such a conventional heat pump, a process for evaporating water in the evaporator. However, heat pumps require only utilization of the heat of condensation of water vapor, in other words they can operate as a heat pump without a process for evaporating water. Stated another way, conventional heat pumps include a process which is essentially unnecessary to carry out.

Bearing in mind the above-described problem, the present invention was made. Accordingly, an object of the present invention is to provide a heat pump utilizing the heat of condensation of water vapor of a simplified structure by eliminating a process for evaporating water.

DISCLOSURE OF THE INVENTION

The present invention provides a first solving means which is directed to a heat pump. The heat pump of the first solving means comprises: a separating means (20) for separating water vapor from a water vapor containing heat source fluid; a pressure increasing means (30, 90) for increasing the pressure of the water vapor separated by the separating means (20); and a hot heat generating means (40, 45) for generating hot heat by causing the water vapor, the pressure of which has been increased by the pressure increasing means (30, 90), to condense.

The present invention provides a second solving means according to the first solving means. In the second solving means, the separating means (20) includes a water vapor permeable membrane (21), whereby water vapor contained in a heat source fluid will pass through the water vapor permeable membrane (21), thereby being separated from the heat source fluid.

The present invention provides a third solving means according to either the first solving means or the second solving means. In the third solving means, the heat source fluid comprises a combustion exhaust gas discharged after utilizing combustion energy of a fuel.

The present invention provides a fourth solving means according to either the first solving means or the second solving means. In the fourth solving means, the heat source fluid comprises moist air.

The present invention provides a fifth solving means according to the fourth solving means. In the fifth solving means, the heat pump further comprises a pre-humidifying means (75) for humidifying a heat source fluid by supplying condensation water produced in the hot heat generating means (40, 45) to the heat source fluid and for delivering the humidified heat source fluid to the separating means (20).

The present invention provides a sixth solving means according to the fourth solving means. In the sixth solving means, the heat pump further comprises a preheating means (70) for heating a heat source fluid by causing condensation water produced in the hot heat generating means (40, 45) to exchange heat with the heat source fluid, and for delivering the heated heat source fluid to the separating means (20).

The present invention provides a seventh solving means according to any one of the first to sixth solving means. In the seventh solving means, the hot heat generating means (45) is so constructed as to heat water by hot heat generated therein.

The present invention provides an eighth solving means according to any one of the first to sixth solving means. In the eighth solving means, the hot heat generating means (40) is so constructed as to heat to-be-heated air by hot heat generated therein.

The present invention provides a ninth solving means according to the eighth solving means. In the ninth solving means, the heat pump further comprises an air humidifying means (55) for humidifying to-be-heated air by supplying condensation water produced in the hot heat generating means (40) to the to-be-heated air.

The present invention provides a tenth solving means according to the eighth solving means. In the tenth solving means, the heat pump further comprises an air humidifying means (50) for humidifying to-be-heated air by supplying a part of the water vapor whose pressure has been increased in the pressure increasing means (30, 90) to the to-be-heated air.

The present invention provides an eleventh solving means according to the tenth solving means. In the eleventh solving means, the air humidifying means (50) includes a water vapor permeable membrane (51), whereby water vapor will pass through the water vapor permeable membrane (51), thereby being supplied to to-be-heated air.

The present invention provides a twelfth solving means according to either the first solving means or the second solving means. In the twelfth solving means, the pressure increasing means is formed by an ejector (90) for drawing in the water vapor separated in the separating means (20) by jetting water vapor supplied from a water vapor supplying means (94).

The present invention provides a thirteenth solving means according to either the first solving means or the second solving means. In the thirteenth solving means, the pressure increasing means is formed by a compressor (30) for compressing water vapor to an increased pressure.

The present invention provides a fourteenth solving means according to the thirteenth solving means. In the fourteenth solving means, the compressor (30) is driven by a steam turbine (60) capable of generating driving force upon receipt of water vapor supplied from water vapor supplying means (61).

The present invention provides a fifteenth solving means according to the thirteenth solving means. In the fifteenth solving means, the compressor (30) is driven both by a steam turbine (60) capable of producing driving force upon receipt of water vapor supplied from water vapor supplying means (61) and by an electric motor (32).

The present invention provides a sixteenth solving means according to either the fourteenth solving means or the fifteenth solving means. In the sixteenth solving means, the water vapor supplying means (61) is formed by a boiler (61) capable of generating superheated water vapor by heating water.

The present invention provides a seventeenth solving means according to the sixteenth solving means. In the seventeenth solving means, the boiler (61) comprises a latent heat section (62) for evaporating water by making utilization of waste heat, and a sensible heat section (63) for generating superheated water vapor by heating water vapor generated by the latent heat section (62).

The present invention provides an eighteenth solving means according to either the sixteenth solving means or the seventeenth solving means. In the eighteenth solving means, the internal pressure of the boiler (61) is set below atmospheric pressure.

The present invention provides a nineteenth solving means according to any one of the fourteenth to eighteenth solving means. In the nineteenth solving means, the hot heat generating means (40, 45) is so constructed as to be fed water vapor expanded in the steam turbine (60) and to generate hot heat by causing the water vapor to condense.

The present invention provides a twentieth solving means according to either the first solving means or the second solving means. In the twentieth solving means, the heat pump further comprises a humidification cooling means (89) for cooling a heat source fluid by humidification and thereafter delivering the cooled heat source fluid to the separating means (20), wherein the heat pump is so constructed as to perform a cooling operation which makes utilization of a heat source fluid from which water vapor has been separated in the separating means (20) and a heating operation for heating an object by making utilization of hot heat produced in the hot heat generating means (40, 45).

Operation of the Invention

In the first solving means, the separating means (20) separates water vapor from a heat source fluid. The water vapor separated from the heat source fluid is delivered to the pressure increasing means (30, 90) where its pressure is increased. This increased-pressure water vapor is introduced into the hot heat generating means (40, 45). In the hot heat generating means (40, 45), the increased-pressure water vapor condenses at a condensation temperature corresponding to the pressure thereof, and radiates heat of condensation. This condensation heat changes to hot heat which is utilized to, for example, heat an object.

In the second solving means, the water vapor contained in the heat source fluid, which has been introduced into the separating means (20), passes through the water vapor permeable membrane (21). More specifically, the water vapor is allowed to pass through the water vapor permeable membrane (21) by the difference in water vapor pressure between the spaces defined by the water vapor permeable membrane (21), so that the water vapor is separated from the heat source fluid.

In the third solving means, combustion exhaust gas is utilized as a heat source fluid. For instance, combustion of a fuel in a gas turbine, engine, boiler or the like produces a combustion exhaust gas. Petroleum and natural gas have been widely used as a fuel, and their combustion exhaust gases contain therein large amounts of water vapor. Because of this, in the present solving means, water vapor present in large amounts in such a combustion exhaust gas is separated therefrom and used to generate hot heat.

In the fourth solving means, moist air is used as a heat source fluid. Any kind of air present in the surroundings such as indoor air and outdoor air always has water vapor content, so that all of them are moist air. In the present solving means, moist air, which exists in large amounts in the surroundings, is used as a heat source for operating the heat pump, and hot heat is generated.

In the fifth solving means, condensation water, produced by condensation of water vapor in the hot heat generating means (40, 45), is introduced to the pre-humidifying means (75). In the pre-humidifying means (75), the condensation water introduced is supplied to the heat source fluid and, as a result, the heat source fluid is humidified. At that time, there is no need to supply the whole condensation water produced in the hot heat generating means (40, 45) to the heat source fluid. That is, only a part of the condensation water may be used for humidification. The heat source fluid, which has been humidified in the pre-humidifying means (75), is supplied to the separating means (20). That is, the heat source fluid becomes humidified in the pre-humidifying means (75), so that its water vapor partial pressure is raised. Thereafter, the heat source fluid is delivered to the separating means (20). Examples of the way of supplying condensation water to a heat source fluid in the pre-humidifying means (75) include: a way of directly spraying condensation water to a heat source fluid and a way of causing moisture to migrate from condensation water to a heat source fluid through a moisture permeable membrane.

In the sixth solving means, condensation water, produced by condensation of water vapor in the hot heat generating means (40, 45), is introduced into the preheating means (70). In the preheating means (70), the condensation water introduced exchanges heat with a heat source fluid. As a result, the heat source fluid is heated. Then, the heat source fluid heated is supplied to the separating means (20).

In the seventh solving means, water is heated by using hot heat generated by the hot heat generating means (45) for generation of warm water. For example, the warm water generated is used to heat an object or for the supply of hot water.

In the eighth solving means, air to be heated is heated by using hot heat generated by the hot heat generating means (40). For example, the heated to-be-heated air is used for providing heating.

In the ninth solving means, condensation water, produced by condensation of water vapor in the hot heat generating means (40), is introduced into the air humidifying means (55). In the air humidifying means (55), the condensation water introduced is supplied to to-be-heated air. As a result, the to-be-heated air is humidified. At that time, there is no need to supply the whole condensation water produced in the hot heat generating means (40) to the to-be-heated air. Alternatively, only a part of the condensation water may be used for humidification. Examples of the way of supplying condensation water to to-be-heated air in the air humidifying means (55) include: a way of directly spraying condensation water to to-be-heated air and a way of causing moisture to migrate from condensation water to to-be-heated air through a moisture permeable membrane.

In the tenth solving means, a part of the water vapor whose pressure has been increased in the pressure increasing means (30, 90) is supplied to to-be-heated air in the air humidifying means (50). That is, without undergoing condensation in the hot heat generating means (40), a part of the increased-pressure water vapor is used to humidify the to-be-heated air in the air humidifying means (50).

In the eleventh solving means, the increased-pressure water vapor, which has been delivered to the air humidifying means (50), passes through the water vapor permeable membrane (51) and is supplied to air to be heated. More specifically, in the air humidifying means (50), water vapor is allowed to pass through the water vapor permeable membrane (51) by the difference in water vapor pressure between the spaces defined by the water vapor permeable membrane (51). As a result, the air to be heated is heated.

In the twelfth solving means, the pressure increasing means is formed by the ejector (90). The water vapor delivered from the water vapor supplying means (94) to the ejector (90) is jetted into the ejector (90) and changes to a high-speed jet stream. This water vapor jetting into the ejector (90) causes the water vapor separated from the heat source fluid in the separating means (20) to be drawn into the ejector (90). The water vapor drawn into the ejector (90) from the separating mean (20) merges with water vapor delivered from the water vapor supplying means (94) and its pressure is increased. Thereafter, the merged water vapor is introduced into the hot heat generating means (40, 45).

In the thirteenth solving means, the pressure increasing means is formed by the compressor (30). The compressor (30) draws in the water vapor separated in the separating means (20) and compresses it to an increased pressure.

In the fourteenth solving means, the steam turbine (60) receives a supply of water vapor from the water vapor supplying means (61) and expands the water vapor to produce driving force. The compressor (30) is driven by the driving force produced in the steam turbine (60). There is no need for driving the compressor (30) by the steam turbine (60) alone. Alternatively, other driving sources, such as an electric motor, a gas turbine, or the like, may be used to drive the compressor (30), together with the steam turbine (60).

In the fifteenth solving means, as in the fourteenth solving means, the steam turbine (60) generates compressor driving force. Compressor driving force generated by the steam turbine (60) is used with compressor driving force generated by the electric motor (32), to drive the compressor (30).

In the sixteenth solving means, the water vapor supplying means (61) is formed by the boiler (61). That is, superheated water vapor generated in the boiler (61) is supplied to the steam turbine (60) and the superheated water vapor is expanded to produce driving force.

In the seventeenth solving means, water supplied to the boiler (61) undergoes evaporation in the latent heat section (62) and is further heated in the sensible heat section (63) to change to superheated water vapor. At that time, in the latent heat section (62) of the boiler (61), waste heat is utilized to evaporate the water. That is, the generation of superheated water vapor requires a latent heat change process for evaporating water to generate vapor and a sensible heat change process for increasing the temperature of the water vapor generated. In the latent heat change process, a high-temperature heat source as is required in the sensible heat change process is not required, but the latent heat change process needs large amounts of heat. Accordingly, waste heat, which cannot be expected to provide high temperature levels but costs nothing, is utilized in a latent heat change process, therefore making it possible to achieve effective waste heat utilization.

On the other hand, in the sensible heat section (63) of the boiler (61), various heat sources are used for the heating of water vapor. That is, in the sensible heat section (63), a sensible heat change process, which requires a high-temperature heat source, is carried out. Examples of this type of heat source are fuel combustion and an electric heater.

In the eighteenth solving means, the internal pressure of the boiler (61) is set below atmospheric pressure. That is, in the boiler (61), water evaporates at 100 degrees centigrade or lower.

In the nineteenth solving means, the water vapor expanded in the steam turbine (60) is delivered to the hot heat generating means (40, 45). Accordingly, the hot heat generating means (40, 45) is fed both the water vapor whose pressure has been increased in the pressure increasing means (30, 90) and the water vapor expanded in the steam turbine (60). In the hot heat generating means (40, 45), the introduced water vapor undergoes condensation at a condensation temperature corresponding to its pressure and radiates heat of condensation. This condensation heat changes to hot heat which is used to, for example, heat an object. That is, the water vapor supplied to the steam turbine (60) is utilized for the generation of driving force in the steam turbine (60). Thereafter, the water vapor is further utilized for the generation of hot heat in the hot heat generating means (40, 45).

In the twentieth solving means, both cooling and heating operations are carried out. These operations may switchably be carried out, or both the operations may be carried out at the same time.

More specifically, during the cooling operation, a heat source fluid is humidified in the humidification cooling means (89). Because of such humidification, the heat source fluid undergoes an approximately isenthalpic process change, and its humidity increases while its temperature drops. Thereafter, water vapor is removed from the heat source fluid in the separating means (20). Then, the water vapor-removed heat source fluid is used. That is, in the cooling operation, a heat source fluid, which is cooled in the humidification cooling means (89) and then dehumidified in the separating means (20), is utilized.

For instance, when moist air is used as a heat source fluid, the moist air is cooled in the humidification cooling means (89), dehumidified in the separating means (20), then supplied to inside the room, for providing room cooling. On the other hand, during the heating operation, water vapor is caused to condense in the hot heat generating means (40, 45), and heat of condensation of the water vapor changes to hot heat for heating an object.

Effects of the Invention

In accordance with the present invention, it is possible to make utilization of water vapor separated from a heat source fluid for generating hot heat. In conventional heat pumps, water is caused to evaporate to generate water vapor, and the generated water vapor is utilized to generate hot heat. On the other hand, according to the present solving means, it is possible to operate the heat pump by use of water vapor separated from the heat source fluid, without a water vapor evaporation process. Accordingly, it becomes possible to omit such a water evaporation process that is required in conventional heat pumps, thereby making it possible to provide a heat pump of a simplified structure.

In the third solving means, combustion exhaust gas is utilized as a heat source fluid. Therefore, combustion exhaust gas is not merely discharged into the atmospheric air. That is, heat that the combustion exhaust gas holds as water vapor's latent heat is collected and utilized as hot heat. This therefore makes it possible to make effective utilization of energy.

In the fourth solving means, moist air is used as a heat source fluid. Therefore, atmospheric air, which is moist air, is used as a heat source for operating the heat pump, and it becomes possible to utilize heat that the atmospheric air holds as water vapor's latent heat, as hot heat.

In the fifth solving means, the heat source fluid humidified with condensation water is delivered to the separating means (20). Therefore, heat held in the condensation water can be collected, as water vapor's latent heat, in the heat source fluid. This makes it possible to make effective utilization of energy.

Further, in accordance with the present solving means, it is possible to introduce a heat source fluid, the water vapor partial pressure of which has been increased by humidification, into the separating means (20). This therefore makes it possible to increase the pressure of post-separation water vapor while maintaining the difference in water vapor pressure between the spaces defined by the water vapor permeable membrane (21). Accordingly, if the pressure of the water vapor after its pressure was increased is constant in the pressure increasing means (30, 90), the ratio, at which pressure is increased in the pressure increasing means (30, 90), can be reduced. As a result, it is possible to reduce power required for increasing the pressure of water vapor in the pressure increasing means (30, 90), thereby making it possible to improve efficiency.

In the sixth solving means, the heat source fluid heated with condensation water is delivered to the separating means (20). Accordingly, heat held in the condensation water can be collected, as water vapor's sensible heat, in the heat source fluid. This makes it possible to make effective utilization of energy.

In accordance with the seventh to eleventh solving means, hot heat produced in the hot heat generating means (40, 45) can be used to heat water as well as to heat air. Especially, in accordance with the ninth to eleventh solving means, it is possible to humidify air to be heated. Accordingly, for example when providing heating by supplying to-be-heated air to inside the room, it is possible to provide not only room heating but also room humidification.

In the twelfth solving means, the pressure increasing means is formed by the ejector (90). Therefore, it is possible to increase the pressure of water vapor without carrying out mechanical operations such as rotational movement, thereby improving not only the reliability of the pressure increasing means but also the reliability of the entire heat pump.

In accordance with the fourteenth and fifteenth solving means, the compressor (30) can be driven by using energy other than electric power. Further, if there exists an excess of water vapor which is discarded without being used in a factory or the like, such an excess of water vapor can be utilized to drive the compressor (30) by using the steam turbine (60).

In the seventeenth solving means, waste heat is utilized in a process of evaporating water in the latent heat section (62) of the boiler (61). Accordingly, waste heat, which cannot be expected to provide high temperature levels but costs nothing, is utilized in a water's latent heat change process which requires large amounts of heat of low temperature level, therefore making it possible to make effective utilization of energy. Further, although a supply of heat produced by for example fuel combustion must be provided to the sensible heat section (63) of the boiler (61), the amount of heat required in the sensible heat section (63) may be greatly smaller than the amount of heat required in the latent heat section (62). Accordingly, utilization of waste heat in the latent heat section (62) makes it possible to reduce the cost of operating the heat pump to a greater extent.

In the eighteenth solving means, the internal pressure of the boiler (61) is set below atmospheric pressure. This completely eliminates the danger of explosion of the boiler (61). Further, in the boiler (61), water undergoes evaporation at 100 degrees centigrade or lower. This therefore makes it possible to allow low temperature waste heat (100 degrees centigrade or lower) which is hard to utilize to be used to evaporate water in the boiler (61). That is, it is possible to make utilization of low temperature waste heat in a water's latent heat change process which requires large amounts of heat. Accordingly, it becomes possible to reduce the cost of energy necessary for operating the heat pump as well as to make effective utilization of energy.

In the nineteenth solving means, water vapor expanded in the steam turbine (60) is delivered to the hot heat generating means (40, 45) where it undergoes condensation. Therefore, latent heat of the water vapor which has already been utilized for the generation of driving force in the steam turbine (60) can be further utilized to generate hot heat, thereby making it possible to make effective utilization of energy.

BRIEF DESCRIPTION OF THE DRAWINGS

FIG. 3 is a schematic arrangement diagram of a heat pump according to a third embodiment of the present invention.

FIG. 4 is a schematic arrangement diagram of a heat pump according to a second exemplary modification of the third embodiment.

BEST MODE FOR CARRYING OUT THE INVENTION

Referring to the accompanying drawings, embodiments of the present invention will be described in detail.

EMBODIMENT 1

Figure 1:
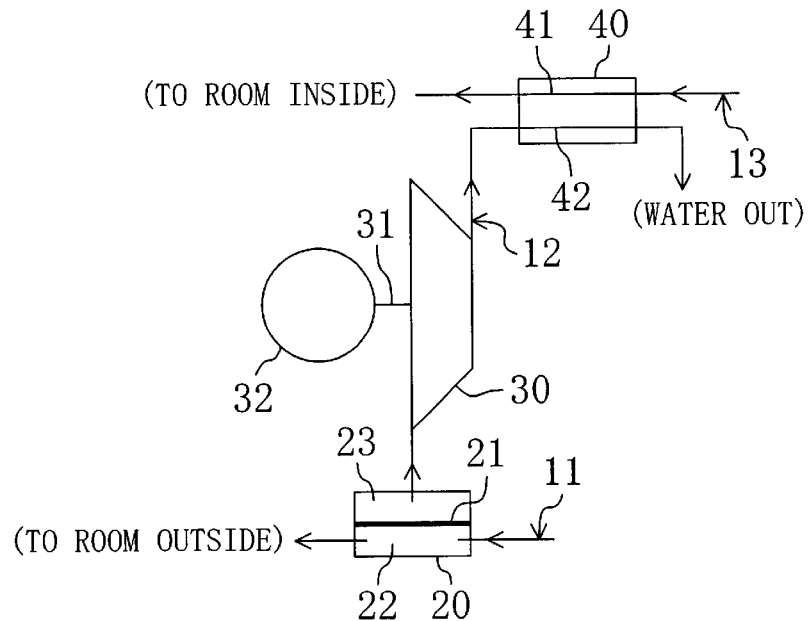
FIG. 1 is a schematic arrangement diagram of a heat pump according to a first embodiment of the present invention.

As shown in FIG. 1, the heat pump of the first embodiment comprises a heat source system (11), a cycle system (12), and a utilization system (13). This heat pump is embodied as an air conditioning machine which utilizes heat source air (moist air) as a heat source fluid to operate and provides heating by supplying heated to-be-heated air indoors.

The cycle system (12) is formed by connecting a water vapor separating section (20) which is a separating means, a compressor (30) which is a pressure increasing means, and a main heat exchanger (40) which is a hot heat generating means in that order.

The water vapor separating section (20) is shaped like a container. The inside of the water vapor separating section

(20) is divided by a water vapor permeable membrane (21) into an air space (22) and a water vapor space (23).

Connected to the air space (22) of the water vapor separating section (20) is the heat source system (11). This heat source system (11) takes in ventilation exhaust air discharged from within the room for ventilation and outdoor air, and delivers heat source air which is a mixture of the ventilation exhaust air and the outdoor air to the air space (22). Further, the heat source system (11) discharges the heat source air flowed out of the air space (22) outdoors.

The pressure of the water vapor space (23) of the water vapor separating section (20) is set to a preselected value. More specifically, the internal pressure of the water vapor space (23) is set lower than the water vapor partial pressure of heat source air introduced into the air space (22). As a result of such setting, there exists a difference in water vapor pressure between the spaces defined by the water vapor permeable membrane (21) in the water vapor separating section (20), thereby allowing water vapor to pass through the water vapor permeable membrane (21). The water vapor separating section (20) is so constructed as to cause water vapor contained in heat source air introduced into the air space (22) to migrate into the water vapor space (23), and the water vapor contained in the heat source air is separated therefrom.

The compressor (30) is formed by a turbocompressor. This compressor (30) is connected to an electric motor (32) through a driving shaft (31). The compressor (30) is rotationally driven by the electric motor (32). The compressor (30) draws in water vapor from the water vapor space (23) of the water vapor separating section (20), and compresses the drawn water vapor so that its pressure is increased. At that time, the compressor (30) increases the pressure of the water vapor up to a specific pressure. More specifically, the compressor (30) increases the pressure of the water vapor up to a saturation pressure corresponding to a condensation temperature necessary for obtaining hot heat of a specific temperature level.

Formed in the main heat exchanger (40) are a heat absorbing side passageway (41) and a heat radiating side passageway (42).

Connected to the heat absorbing side passageway (41) of the main heat exchanger (40) is the utilization system (13). The utilization system (13) takes in introduced outside air introduced indoors for ventilation and indoor air, and delivers to-be-heated air which is a mixture of the introduced outside air and the indoor air to the heat absorbing side passageway (41). Further, the utilization system (13) supplies the to-be-heated air flowed out of the heat absorbing side passageway (41) indoors.

The water vapor, the pressure of which has been increased in the compressor (30), is introduced into the heat radiating side passageway (42) of the main heat exchanger (40). The main heat exchanger (40) causes the to-be-heated air in the heat absorbing side passageway (41) and the water vapor in the heat radiating side passageway (42) to exchange heat, wherein heat of condensation, liberated when the water vapor underwent condensation, is utilized as hot heat for heating the to-be-heated air.

Running Operation

Heat source air is supplied, through the heat source system (11), to the air space (22) of the water vapor separating section (20). Water vapor contained in the heat source air passes through the water vapor permeable membrane (21) and migrates to the water vapor space (23). The water vapor moved into the water vapor space (23) is drawn by the compressor (30) and flows out from the water vapor space (23). Meanwhile, the water vapor-removed heat source air is expelled outdoors through the heat source system (11).

The water vapor drawn into the compressor (30) is compressed to an increased pressure. Thereafter, the increased-pressure water vapor is directed to the heat radiating side passageway (42) of the main heat exchanger (40). Further, to-be-heated air is supplied, through the utilization system (13), to the heat absorbing side passageway (41) of the main heat exchanger (40). In the main heat exchanger (40), the to-be-heated air present in the heat absorbing side passageway (41) and the water vapor present in the heat radiating side passageway (42) exchange heat. Heat of condensation is liberated when the water vapor condenses in the heat radiating side passageway (42). The to-be-heated air in the heat absorbing side passageway (41) is heated by this condensation heat. The to-be-heated air thus heated is supplied indoors through the utilization system (13). This supply of the to-be-heated air provides heating. On the other hand, condensation water resulting from the condensation of the water vapor is discharged outdoors.

Here, in the first embodiment, the heat source air is composed of ventilation exhaust air and outdoor air, whereas the to-be-heated air is composed of introduced outside air and indoor air. Accordingly, heating is provided simultaneously with ventilation by discharging the heat source air outdoors while supplying the to-be-heated air indoors. Further, a part of the heat source air is used as ventilation exhaust air, and a part of the heat held in this ventilation exhaust air is collected as water vapor's latent heat and the heat collected is utilized to heat the to-be-heated air.

Effects of the First Embodiment

In the first embodiment, the water vapor permeable membrane (21) is used to separate water vapor from the heat source air which is moist air, in the water vapor separating section (20). Accordingly, unlike conventional heat pumps in which hot heat is generated by making utilization of water vapor obtained by evaporating water, it is possible for the first embodiment to operate the heat pump by using water vapor separated from the heat source air without a process for evaporating water. Because of this, it is possible to eliminate a water evaporating process required in conventional heat pumps, thereby making it possible to provide a heat pump of a simplified structure.

Further, in accordance with the first embodiment, the heat pump operates by using moist air present in the surroundings as a heat source, which makes it possible to utilize heat that the moist air holds as water vapor's latent heat as hot heat. Unlike heat pumps of the type in which widely-used fluorocarbon refrigerants are employed, the heat pump of the present embodiment is completely immune from any harmful environmental effects due to the leakage of such refrigerants.

Furthermore, in the first embodiment, the heat source air is composed of ventilation exhaust air and outdoor air, whereas the air to be heated is composed of introduced outside air and indoor air. Accordingly, as described above, it is possible to provide room heating simultaneously with ventilation. Additionally, since a part of the heat source air serves as ventilation exhaust air, this makes it possible to collect a part of the heat held in the ventilation exhaust air in the to-be-heated air, as a result of which energy loss accompanying ventilation can be reduced.

Exemplary Modifications of the First Embodiment

Exemplary Modification 1

In the first embodiment, the compressor (30) is driven by the electric motor (32). However, the driving source of the compressor (30) is not limited to the electric motor (32). Any other driving sources can be used to actuate the compressor (30). Examples of the compressor driving source are a gas turbine, a gas engine, and so forth. Any driving source can be employed as long as it can drive the compressor (30).

When using as the driving source of the compressor (30), for example, a gas turbine capable of generating driving force by combustion of a fuel, combustion exhaust gas resulting from fuel combustion can be used as a heat source fluid. That is, the combustion of fuels such as petroleum and natural gas generates a combustion exhaust gas having a high water vapor content. Accordingly, combustion exhaust gas is not simply discharged, but latent heat and sensible heat of the water vapor contained in the combustion exhaust gas are collected and used to generate hot heat, thereby making it possible to make effective utilization of energy.

Exemplary Modification 2

In the first embodiment, air to be heated is delivered to the main heat exchanger (40) through the utilization system (13). In this way the to-be-heated air is heated. On the other hand, an alternative arrangement may be made in which water is delivered, through the utilization system (13), to the main heat exchanger (40) where the water is heated to generate warm water. In this case, the warm water generated may be used to heat indoor air for providing heating. Alternatively, the as generated warm water may be used for hot water supply.

EMBODIMENT 2

A second embodiment of the present invention differs from the first embodiment in that the main heat exchanger (40) is replaced by a condensing section (45), and the arrangement of the utilization system (13) is altered accordingly. Other arrangements of the second embodiment are the same as those shown in the first embodiment. The first exemplary modification of the first embodiment is applicable also to the second embodiment.

Figure 2:
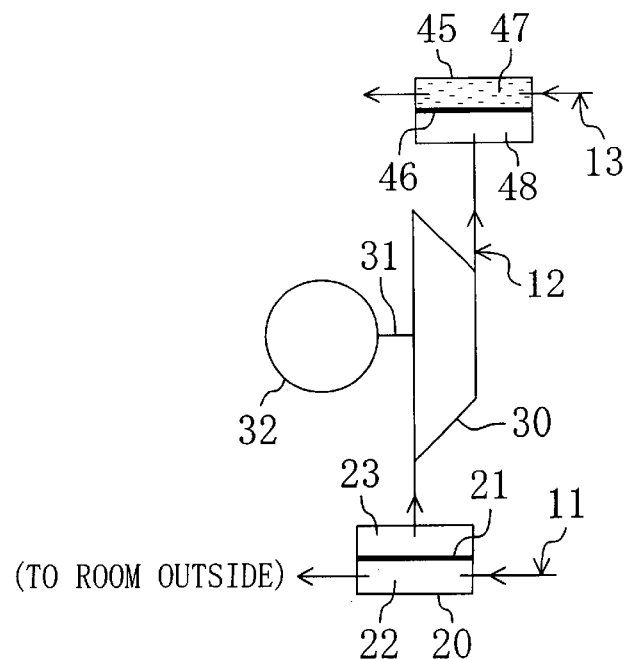
FIG. 2 is a schematic arrangement diagram of a heat pump according to a second embodiment of the present invention.

As shown in FIG. 2, the condensing section (45) is shaped like a container. The inside of the condensing section (45) is divided by a moisture permeable membrane (46) into a heating medium water space (47) and a water vapor space (48).

Connected to the heating medium water space (47) of the condensing section (45) is the utilization system (13). The utilization system (13) of the present embodiment is a closed circuit in which heating medium water circulates between a fan coil unit (not shown) and the condensing section (45). In the fan coil unit, heating medium water delivered from the condensing section (45) and indoor air exchange heat.

Water vapor, the pressure of which has been increased up to a specific pressure in the compressor (30), is introduced into the water vapor space (48) of the condensing section (45). At that time, the pressure of the water vapor present in the water vapor space (48) is higher than a saturation pressure corresponding to the temperature of the heating medium water present in the heating medium water space (47), and the water vapor in the water vapor space (48) passes through the moisture permeable membrane (46). The condensing section (45) is so structured as to cause water vapor present in the water vapor space (48) to migrate to the heating medium water space (47) where the water vapor condenses, whereby heat of condensation liberated during the condensation is used to heat the heating medium water present in the heating medium water space (47).

Running Operation

The heat source system (11), the water vapor separating section (20), and the compressor (30) operate in the same way as their counterparts in the first embodiment. That is, water vapor is separated from the heat source air supplied to the air space (22) of the water vapor separating section (20) through the heat source system (11). The water vapor separated is compressed to an increased pressure in the compressor (30).

The increased-pressure water vapor is delivered into the water vapor space (48) of the condensing section (45). Meanwhile, heating medium water from the fan coil unit is delivered into the heating medium water space (47) of the condensing section (45) through the utilization system (13). In this condensing section (45), the water vapor in the water vapor space (48) passes through the moisture permeable membrane (46) and migrates to the heating medium water space (47), and the heating medium water is heated by heat of condensation of the water vapor. The heating medium water heated is delivered to the fan coil unit through the utilization system (13) and used to heat indoor air. This heated indoor air is supplied indoors for providing heating.

In accordance with the second embodiment, like the first embodiment, the operation of the heat pump can be carried out without a process for evaporating water, thereby making it possible to provide a heat pump of a simplified structure.

Exemplary Modification of the Second Embodiment

In the second embodiment, the heating medium water is circulated in the utilization system (13) and used to heat indoor air. Alternatively, hot water supply may be provided by supplying heated heating medium water as warm water.

EMBODIMENT 3

A third embodiment of the present invention differs from the first embodiment in that an air humidifying section (50) which is an air humidifying means is added. Other arrangements of the third embodiment are the same as those shown in the first embodiment. Further, the first exemplary modification of the first embodiment is applicable also to the third embodiment.

As shown in FIG. 3, the air humidifying section (50) is shaped like a container. The inside of the air humidifying section (50) is divided by a water vapor permeable membrane (51) into a water vapor space (53) and an air space (52).

The water vapor space (53) of the air humidifying section (50) is connected between the compressor (30) and the main heat exchanger (40) in the cycle system (12). Water vapor whose pressure has been increased in the compressor (30) is introduced into the water vapor space (53). On the other hand, the air space (52) of the air humidifying section (50) is connected to the downstream side of the main heat exchanger (40) in the utilization system (13). Air to be heated, which has been heated when flowing through the heat absorbing side passageway (41) of the main heat exchanger (40), is introduced into the air space (52).

In the air humidifying section (50), a part of the water vapor, compressed to an increased pressure in the compressor (30) and introduced into the water vapor space (53), passes through the water vapor permeable membrane (51) and migrates into the air space (52). Stated another way, the air humidifying section (50) is constructed so that a part of the increased-pressure water vapor is utilized to humidify air to be heated, and the remaining increased-pressure water vapor is directed to the heat radiating side passageway (42) of the main heat exchanger (40) where it is used to heat air to be heated. Further, the to-be-heated air, which has been humidified in the air humidifying section (50), is supplied indoors through the utilization system (13). That is, the to-be-heated air, after being heated in the main heat exchanger (40) and humidified in the air humidifying section (50), is supplied to inside the room.

Accordingly, in accordance with the third embodiment, it is possible to provide not only room heating but also room humidification. Further, in the third embodiment, water vapor, separated from the heat source air in the water vapor separating section (20), is utilized to humidify air to be heated, so that the supply of water for humidification is not required at all.

Exemplary Modifications of the Third Embodiment
Exemplary Modification 1

In the third embodiment, the main heat exchanger (40) and the air humidifying section (50) are separate parts. Alternatively, the main heat exchanger (40) may be formed integrally with the air humidifying section (50). That is, the heat radiating side passageway (42) and the heat absorbing side passageway (41) in the main heat exchanger (40) are in part zone-formed by a water vapor permeable membrane, and a part of water vapor in the heat radiating side passageway (42) is supplied to to-be-heated air in the heat absorbing side passageway (41) while at the same time causing the water vapor and the to-be-heated air to exchange heat.

Exemplary Modification 2

In the third embodiment, the air humidifying section (50) is constructed so that air to be heated is humidified by using increased-pressure water vapor. Alternatively, the following construction may be used.

As shown in FIG. 4, the air humidifying section (55) of the second exemplary modification humidifies to-be-heated air by utilization of condensation water produced in the main heat exchanger (40). More specifically, the air humidifying section (55) is connected to the downstream side of the main heat exchanger (40) in the utilization system (13). Further, some of the condensation water produced in the heat radiating side passageway (42) of the main heat exchanger (40) is delivered into the air humidifying section (55). The air humidifying section (55) sprays the condensation water directly to air to be heated, and the to-be-heated air is humidified.

EMBODIMENT 4

A fourth embodiment of the present invention differs from the first embodiment in that a steam turbine (60), a boiler (61) which is a water vapor supplying means (61), and a preheat heat exchanger (70) which is a preheating means are added, wherein the compressor (30) is driven by the steam turbine (60). Further, because of the addition of the steam turbine (60) and the boiler (61), the arrangement of the cycle system (12) is altered. Other arrangements of the fourth embodiment are the same as those shown in the first embodiment.

Figure 5:
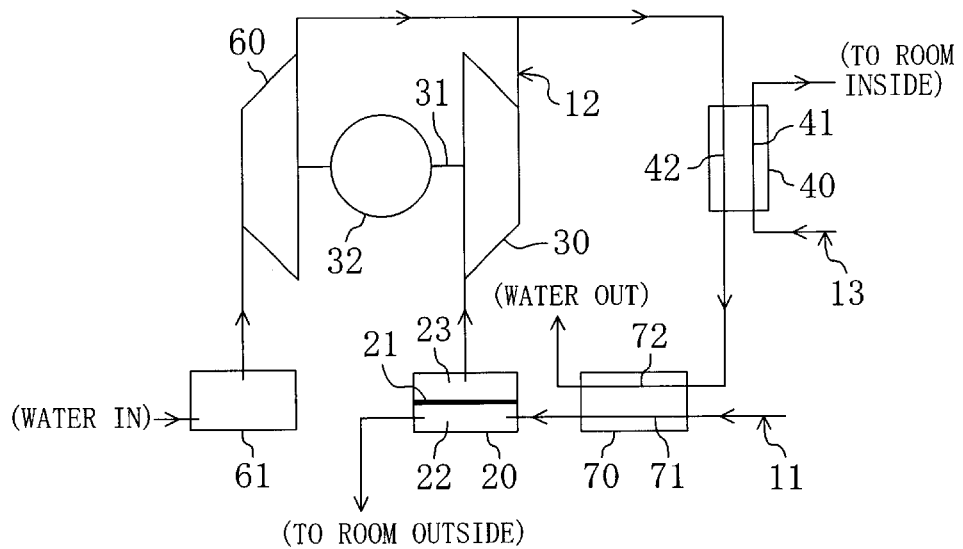
FIG. 5 is a schematic arrangement diagram of a heat pump according to a fourth embodiment of the present invention.

As shown in FIG. 5, in the boiler (61), water supplied is heated by combustion of a fuel to produce water vapor. This produced water vapor is supplied to the steam turbine (60). More specifically, the internal pressure of the boiler (61) is set to a specific pressure below atmospheric pressure. In the boiler (61), a fuel such as petroleum and natural gas is burned to produce heat by which water is caused to evaporate and the resulting water vapor is further heated to produce superheated water vapor.

The superheated water vapor produced in the boiler (61) is supplied to the steam turbine (60). In the steam turbine (60), the superheated water vapor supplied is expanded to generate driving force. Further, the steam turbine (60) is connected to the compressor (30) through a driving shaft (31). In other words, in the fourth embodiment the electric motor (32) and the steam turbine (60) are connected to the compressor (30). Accordingly, the compressor (30) are rotationally driven both by the electric motor (32) and by the steam turbine (60).

In the cycle system (12) of the present embodiment, both the compressor (30) and the steam turbine (60) are connected in parallel upstream of the main heat exchanger (40). That is, the cycle system (12) is constructed so that both water vapor whose pressure has been increased in the compressor (30) and water vapor which has been expanded in the steam turbine (60) are delivered into the main heat exchanger (40).

Formed in the preheat heat exchanger (70) are an air side passageway (71) and a water side passageway (72). The air side passageway (71), connected to the upstream side of the water vapor separating section (20) in the heat source system (11), is fed heat source air. On the other hand, the water side passageway (72), connected to the downstream side of the main heat exchanger (40) in the cycle system (12), is fed condensation water produced in the main heat exchanger (40). In the preheat heat exchanger (70), the heat source air in the air side passageway (71) is heated by heat exchange with the condensation water in the water side passageway (72), and the heat source air heated is delivered into the air space (22) of the water vapor separating section (20).

Running Operation

The heat source air taken in the heat source system (11) is delivered into the air side passageway (71) of the preheat heat exchanger (70). Flowing through the air side passageway (71), the heat source air is heated by heat exchange with the condensation water in the water side passageway (72). That is, heat held in the condensation water is collected in the heat source air.

The heat source air heated is delivered into the air space (22) of the water vapor separating section (20). Water vapor contained in the heat source air passes through the water vapor permeable membrane (21) and migrates to the water vapor space (23). The water vapor, which is now in the water vapor space (23), is drawn by the compressor (30) and flows out of the water vapor space (23). In the compressor (30), the drawn water vapor is compressed to an increased pressure. Further, the heat source air, from which the water vapor was separated in the air space (22), is discharged outdoors through the heat source system (11).

Meanwhile, in the boiler (61), superheated water vapor having a specific temperature and a pressure (for example, 495 degrees centigrade and 80 kPa) is generated. This superheated water vapor is supplied to the steam turbine (60). The steam turbine (60) expands the supplied superheated water vapor to generate driving force. The compressor (30) is rotationally driven by driving force generated by the steam turbine (60) and by driving force generated by the electric motor (32).

Both the water vapor whose pressure has been increased in the compressor (30) and the water vapor which has been expanded in the steam turbine (60) are delivered into the heat radiating side passageway (42) of the main heat exchanger (40). Further, air to be heated is supplied, through the utilization system (13), to the heat absorbing side passageway (41) of the main heat exchanger (40). In the main heat exchanger (40), the to-be-heated air in the heat absorbing side passageway (41) and the water vapor in the heat radiating side passageway (42) exchange heat. Heat of condensation of the water vapor is liberated when it condenses in the heat radiating side passageway (42). The to-be-heated air in the heat absorbing side passageway (41)

is heated by this condensation heat. That is, not only heat of condensation of water vapor whose pressure has been increased in the compressor (30) but also heat of condensation of water vapor which has been expanded in the steam turbine (60) is used to heat air to be heated. The heated to-be-heated air is supplied indoors through the utilization system (13). This supply of the to-be-heated air provides heating.

Condensation water as a result of the condensation of water vapor in the heat radiating side passageway (42) of the main heat exchanger (40) is delivered into the water side passageway (72) of the preheat heat exchanger (70). The condensation water delivered to the water side passageway (72) exchanges heat with heat source air in the air side passageway (71) and liberates heat to the heat source air. The condensation water produced in the main heat exchanger (40) is at a certain high temperature (for example, 40 to 50 degrees centigrade), so that heat held in the condensation water is collected in the heat source air. The condensation water flowed out from the water side passageway (72) of the preheat heat exchanger (70) is thereafter discharged outdoors.

Effects of the Fourth Embodiment

In accordance with the fourth embodiment, the following effects can be obtained in addition to the effects of the first embodiment.

In the fourth embodiment, the compressor (30) is driven by not only the electric motor (32) but also the steam turbine (60). This means that not only electric energy but also thermal energy can be used to drive the compressor (30). Further, it is arranged such that water vapor expanded in the steam turbine (60) is delivered into the main heat exchanger (40). As a result of such arrangement, water vapor generated in the boiler (61) can be utilized not only for the generation of driving force in the steam turbine (60) but also for the heating of to-be-heated air in the main heat exchanger (40), which makes it possible to make effective utilization of energy. Furthermore, the internal pressure of the boiler (61) is set below atmospheric pressure. This setting completely eliminates the danger of explosion of the boiler (61), thereby improving safety.

Further, in the fourth embodiment, condensation water produced in the main heat exchanger (40) is delivered to the preheat heat exchanger (70), and heat source air heated by the condensation water is supplied to the water vapor separating section (20). Accordingly, it is possible to collect heat held in the condensation water, as sensible heat of water vapor contained in the heat source air, thereby making it possible to make effective utilization of energy.

Exemplary Modifications of the Fourth Embodiment

Exemplary Modification 1

In the fourth embodiment, fuel combustion heat is used to generate superheated water vapor in the boiler (61). Alternatively, waste heat may be utilized. That is, waste heat discharged out of various equipment is not directly discarded but is used in the boiler (61). Examples of this type of waste heat are heat held in exhaust gases from gas turbines and gas engines and heat discharged from for example a co-generation system.

Figure 6:
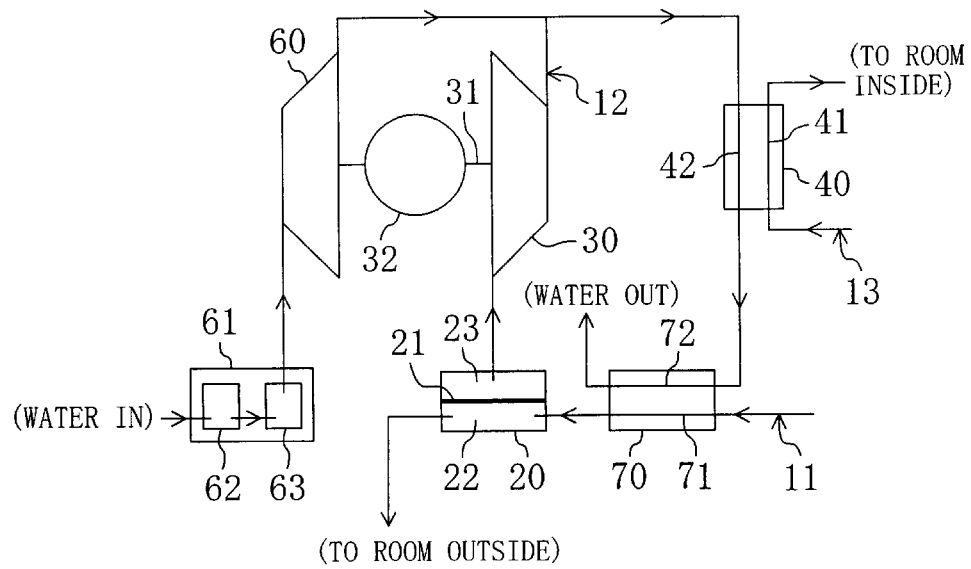
FIG. 6 is a schematic arrangement diagram of a heat pump according to a first exemplary modification of the fourth embodiment.

Further, it may be arranged such that waste heat is utilized only for a latent heat change process for evaporating water in the boiler (61). In this case, as shown in FIG. 6, the boiler (61) is equipped with a latent heat section (62) and a sensible heat section (63). The latent heat section (62) uses waste heat to heat and evaporate water supplied. On the other hand, the sensible heat section (63) further heats the water vapor produced in the latent heat section (62) to such an extent that it changes to superheated water vapor. At that time, the sensible heat section (63) uses fuel combustion heat to heat the water vapor.

Here, the reason for the utilization of waste heat in the latent heat section (62) is as follows. That is, it is sufficient for the temperature level of heat required in the process of a latent heat change in the latent heat section (62) to be lower than the temperature level of heat required in the process of a sensible heat change in the sensible heat section (63). However, the amount of heat required in the process of a latent heat change is much larger than the amount of heat required in the process of a sensible heat change. Accordingly, the arrangement that waste heat, which cannot be expected to provide high temperature levels but costs nothing, is utilized in a latent heat change process requiring a large amount of heat of low temperature level, makes it possible to achieve effective waste heat utilization. Besides, only heating in the sensible heat section (63), the amount of which is small, is expensive, thereby making it possible to greatly reducing the cost of energy that the operation of the heat pump requires.

Especially, in the fourth embodiment, the internal pressure of the boiler (61) is set below atmospheric pressure and the evaporation temperature of water in the boiler (61) is 100 degrees centigrade or lower. This makes it possible that even low temperature waste heat which is difficult to utilize because of its temperature level of 100 degrees centigrade or lower can be utilized in a latent heat change process in the latent heat section (62) of the boiler (61) requiring larger amounts of heat.

In the first exemplary modification, fuel combustion heat is used to provide heating in the sensible heat section (63). Alternatively, for example an electric heater may be used. Further, in the boiler (61) the latent heat section (62) and the sensible heat section (63) may be formed integrally with each other. Further, the latent heat section (62) and the sensible heat section (63) may be formed separately and connected together by piping.

Exemplary Modification 2

In the fourth embodiment, driving force is generated by supplying water vapor generated in the boiler (61) to the steam turbine (60). If there exists an excess of water vapor which is discarded without being used in a factory or the like, such an excess of water vapor may be supplied to the steam turbine (60) for the generation of driving force.

Exemplary Modification 3

In the fourth embodiment, the compressor (30) is driven both by the steam turbine (60) and by the electric motor (32). Alternatively, it may be arranged such that the compressor (30) is driven by only the steam turbine (60).

EMBODIMENT 5

A fifth embodiment of the present invention differs from the second embodiment in that the steam turbine (60) and the boiler (61) which is a water vapor supplying means (61) are added and the compressor (30) is driven also by the steam turbine (60). Further, because of the addition of the steam turbine (60) and the boiler (61), the arrangement of the cycle system (12) is altered accordingly. The other arrangements of the fifth embodiment are the same as those shown in the second embodiment.

Figure 7:
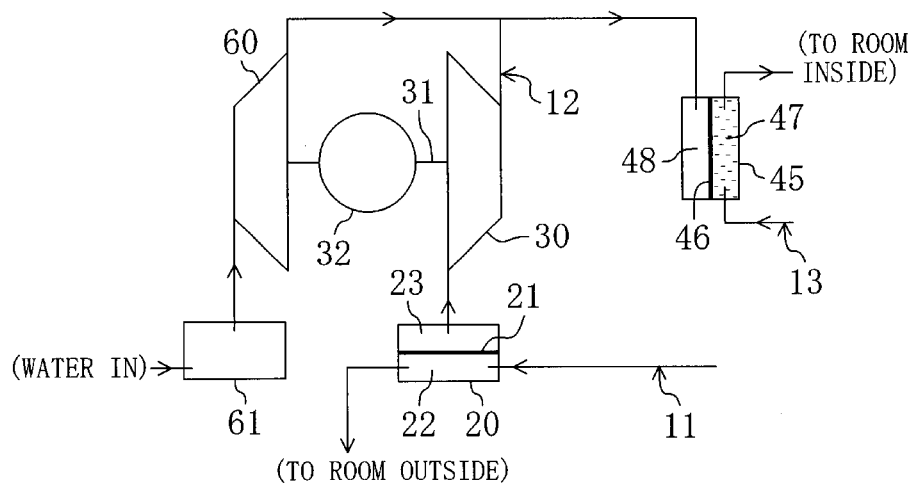
FIG. 7 is a schematic arrangement diagram of a heat pump according to a fifth embodiment of the present invention.

As can be seen from FIG. 7, the steam turbine (60) and the boiler (61) in the fifth embodiment are constructed in the same way as the steam turbine (60) and the boiler (61) in the fourth embodiment. That is, the boiler (61) generates superheated water vapor and supplies it to the steam turbine (60), and the compressor (30) is rotationally driven by driving force produced by the steam turbine (60) and the electric motor (32). Accordingly, the first to third exemplary modifications of the fourth embodiment can be applicable also to the fifth embodiment.

Further, the cycle system (12) of the fifth embodiment is constructed such that both water vapor whose pressure has been increased in the compressor (30) and water vapor which has been expanded in the steam turbine (60) are delivered into the water vapor space (48) of the condensing section (45).

Running Operation

The operation of the water vapor separating section (20) and the operation of the compressor (30) are the same as those as shown in the second embodiment. That is, water vapor is separated from the heat source air introduced into the air space (22) of the water vapor separating section (20), and the water vapor separated is compressed to an increased pressure in the compressor (30).

On the other hand, the operation of the boiler (61) and the operation of the steam turbine (60) are the same as those shown in the fourth embodiment. That is, superheated water vapor generated in the boiler (61) is delivered to the steam turbine (60) and driving force generated by water vapor expansion in the steam turbine (60) is utilized to actuate the compressor (30).

Both the water vapor whose pressure has been increased in the compressor (30) and the water vapor which has been expanded in the steam turbine (60) are delivered into the water vapor space (48) of the condensing section (45). The water vapor thus introduced into the water vapor space (48) passes through the moisture permeable membrane (46) of the condensing section (45) and condenses to develop heat of condensation by which heating medium water in the heating medium water space (47) is heated. This heating medium water heated is delivered to the fan coil unit (not shown) and utilized to heat indoor air.

EMBODIMENT 6

A sixth embodiment of the present invention differs from the third embodiment in that the steam turbine (60), the boiler (61) which is a water vapor supplying means (61), and the preheat heat exchanger (70) which is a preheating means are added and the compressor (30) is driven also by the steam turbine (60). Further, because of the addition of the steam turbine (60) and the boiler (61), the arrangement of the cycle system (12) is altered accordingly. The other arrangements of the sixth embodiment are the same as those shown in the third embodiment. Therefore, the first and second exemplary modifications of the third embodiment can be applied also to the sixth embodiment.

Figure 8:
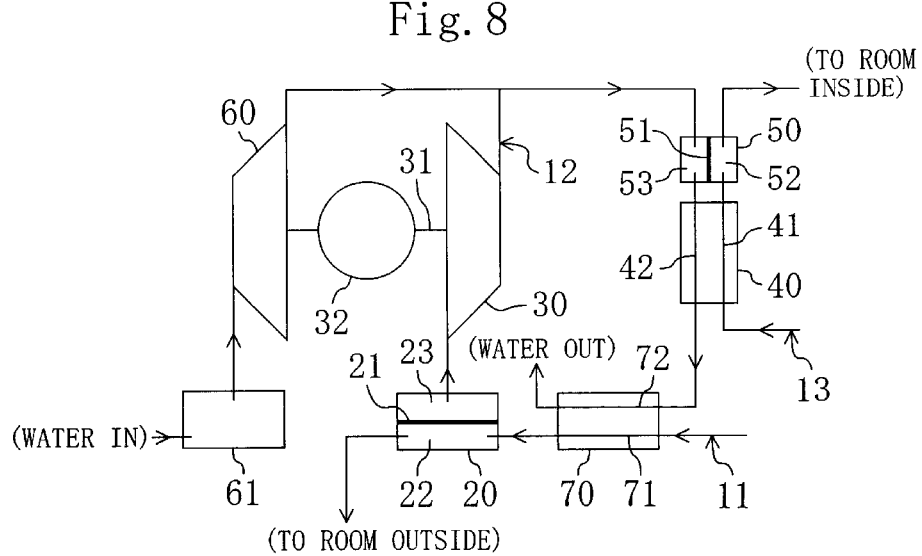
FIG. 8 is a schematic arrangement diagram of a heat pump according to a sixth embodiment of the present invention.

As shown in FIG. 8, the steam turbine (60), the boiler (61), and the preheat heat exchanger (70) are constructed in the same way as their counterparts of the fourth embodiment. That is, the boiler (61) generates superheated water vapor and supplies it to the steam turbine (60), and the compressor (30) is driven by driving force generated by the steam turbine (60) and the electric motor (32). Accordingly, the first to third exemplary modifications of the fourth embodiment can be applied also to the sixth embodiment.

Further, the cycle system (12) of the sixth embodiment is constructed such that both water vapor whose pressure has been increased in the compressor (30) and water vapor which has been expanded in the steam turbine (60) are delivered into the water vapor space (53) of the air humidifying section (50).

Running Operation

Figure 9:
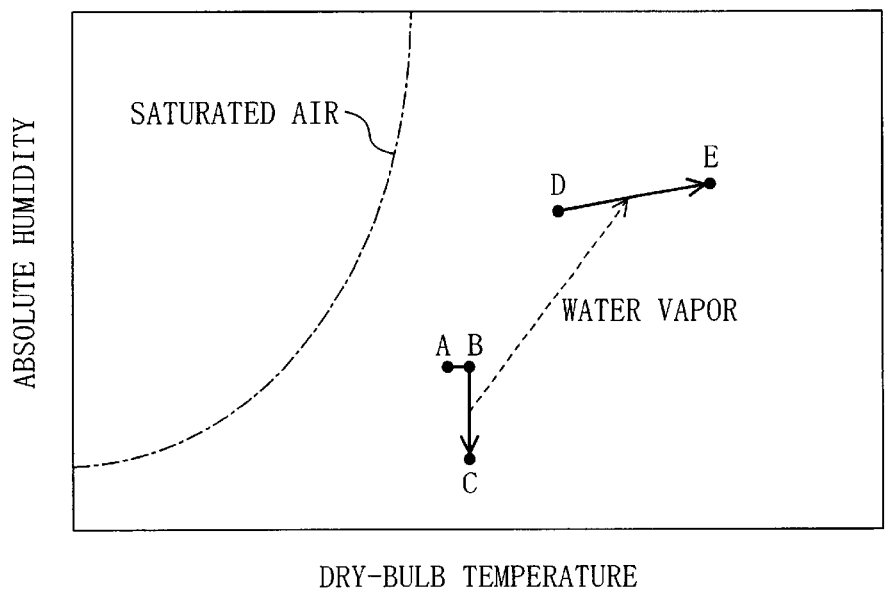
FIG. 9 is a psychrometric chart for providing a description of the operation of the heat pump of the sixth embodiment.

Referring now to FIG. 9, the running operation of the heat pump according to the sixth embodiment will be described.

Heat source air in the state of Point A taken in the heat source system (11) is delivered into the air side passageway (71) of the preheat heat exchanger (70). While flowing through the air side passageway (71), the heat source air is heated by exchanging heat with condensation water in the water side passageway (72) and enters the state of Point B. That is, heat held in the condensation water is collected in the heat source air, and the temperature of the heat source air is raised.

The heat source air in the state of Point B is delivered into the air space (22) of the water vapor separating section (20). Water vapor contained in the hear source air passes through the water vapor permeable membrane (21) and migrates into the water vapor space (23). Because of this movement of the water vapor, the absolute humidity of the heat source air drops and the heat source air enters the state of Point C. The water vapor, which has moved into the water vapor space (23), is drawn by the compressor and flows out of the water vapor space (23). In the compressor (30), the water vapor drawn is compressed to an increased pressure. Further, the heat source air in the state of Point C, from which water vapor has been separated in the air space (22), is discharged outdoors through the heat source system (11).

Meanwhile, the boiler (61) generates superheated water vapor of a specific temperature and a pressure (for example 495 degrees centigrade and 80 kPa), and this superheated water vapor is supplied to the steam turbine (60). The steam turbine (60) expands the superheated water vapor supplied to generate driving force. The compressor (30) is rotationally driven by driving force generated by the steam turbine (60) and by driving force generated by the electric motor (32).

Both the water vapor whose pressure has been increased in the compressor (30) and the water vapor which has been expanded in the steam turbine (60) are delivered into the water vapor space (53) of the air humidifying section (50). A part of the water vapor introduced into the water vapor space (53) passes through the water vapor permeable membrane (51) and migrates into the air space (52). Because of this movement of the water vapor, to-be-heated air introduced into the air space (52) of the air humidifying section (50) is humidified. The remaining water vapor in the water vapor space (53) is delivered into the heat radiating side passageway (42) of the main heat exchanger (40).

In the main heat exchanger (40), the to-be-heated air in the heat absorbing side passageway (41) and the water vapor in the heat radiating side passageway (42) exchange heat. Heat of condensation is liberated when the water vapor condenses in the heat radiating side passageway (42) and the to-be-heated air in the heat absorbing side passageway (41) is heated by this condensation heat. That is, the to-be-heated air in the state of Point D undergoes an increase in temperature by heating in the main heat exchanger (40) as well as an increase in humidity by humidification in the air humidifying section (50), thereby entering the state of Point E. The to-be-heated air in the state of Point E is supplied indoors through the utilization system (13). This supply of the to-be-heated air provides heating.

Condensation water generated by condensation of the water vapor in the heat radiating side passageway (42) of the main heat exchanger (40) is delivered to the water side passageway (72) of the preheat heat exchanger (70). The condensation water delivered to the water side passageway (72) exchanges heat with heat source air in the air side passageway (71) and liberates heat to the heat source air. That is, condensation water generated in the main heat exchanger (40) is in a certain high temperature state (for example, about 40 to about 50 degrees centigrade), so that heat held in the condensation water is collected in the heat source air. The condensation water flowed out of the water side passageway (72) of the preheat heat exchanger (70) is thereafter discharged outdoors.

EMBODIMENT 7

A seventh embodiment of the present invention differs from the sixth embodiment in that a pre-humidifying section (75) which is a pre-humidifying means is provided in place of the preheat heat exchanger (70). The other arrangements of the seventh embodiment are the same as those shown in the sixth embodiment. Accordingly, exemplary modifications applicable to the sixth embodiment can be applied also to the present embodiment.

Figure 10:
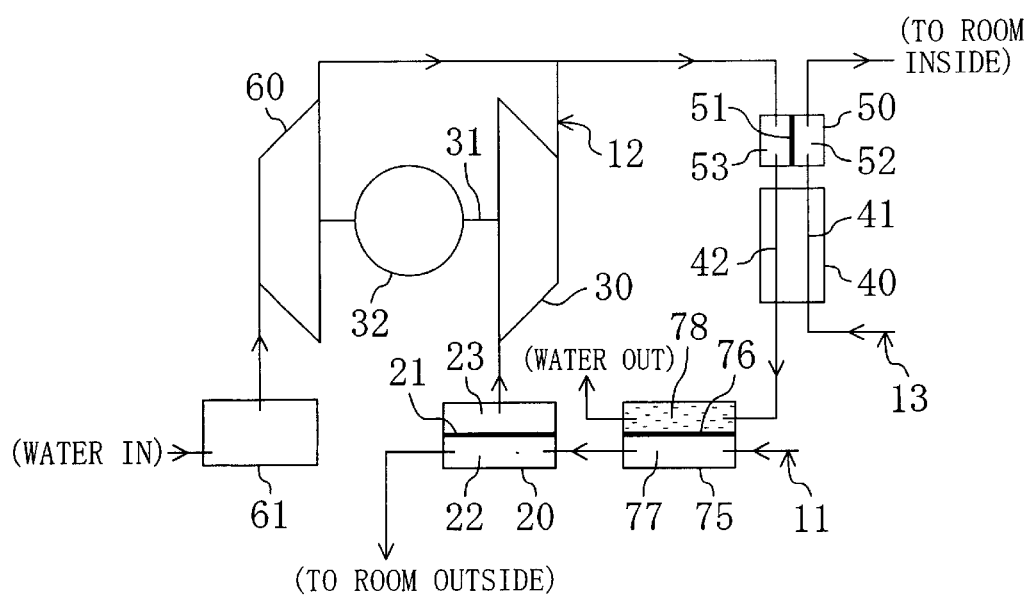
FIG. 10 is a schematic arrangement diagram of a heat pump according to a seventh embodiment of the present invention.

As shown in FIG. 10, the pre-humidifying section (75) is shaped like a container. The inside of the pre-humidifying section (75) is divided by a moisture permeable membrane (76) into an air space (77) and a water side space (78). The air space (77) is connected to the upstream side of the water vapor separating section (20) in the heat source system (11), wherein heat source air is delivered to the air space (77). On the other hand, the water side space (78) is connected to the downstream side of the main heat exchanger (40) in the cycle system (12), wherein condensation water generated in the main heat exchanger (40) is delivered into the water side space (78). The pre-humidifying section (75) supplies the condensation water introduced into the water side space (78) to heat source air in the air space (77). After being humidified, the heat source air is delivered to the water vapor separating section (20).

Running Operation

Figure 11:
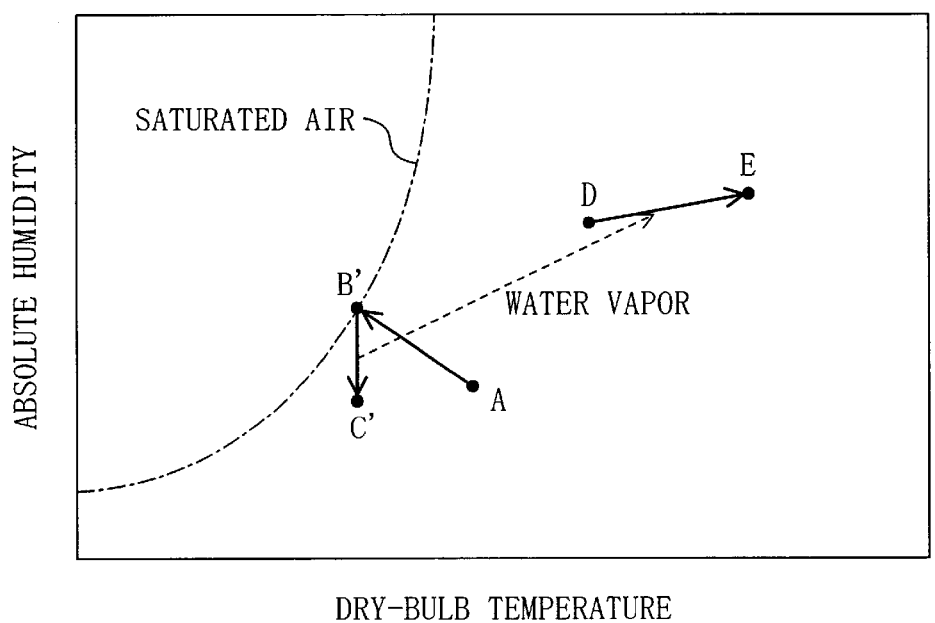
FIG. 11 is a psychrometric chart for providing a description of the operation of the heat pump of the seventh embodiment.

Referring to FIG. 11, the running operation of the heat pump according to the seventh embodiment will be described.

Heat source air in the state of Point A, which has been taken in the heat source system (11), is delivered into the air space (77) of the pre-humidifying section (75). Condensation water in the water side space (78) is supplied, through the moisture permeable membrane (76), to the heat source air in the air space (77). By this supply of the condensation water, the state of the heat source air undergoes an approximately isenthalpic process change. That is, in the air space (77), the absolute humidity of the heat source air increases and its temperature decreases. As a result, the heat source air enters the state of Point B'. Therefore, in the pre-humidifying section (75), heat held in the condensation water is collected, as water vapor's latent heat, in the heat source air.

The heat source air in the state of Point B' is delivered into the air space (22) of the water vapor separating section (20). Water vapor contained in the heat source air passes through the water vapor permeable membrane (21) and migrates into the water vapor space (23). Because of this movement of the water vapor, the absolute humidity of the heat source air drops and the heat source air enters the state of Point C'. The water vapor, which has moved into the water vapor space (23), is drawn by the compressor (30) and flows out of the water vapor space (23). In the compressor (30), the drawn water vapor is compressed to an increased pressure. Further, the heat source air in the state of Point C', from which water vapor has been separated in the air space (22), is discharged outdoors through the heat source system (11).

Meanwhile, the boiler (61) generates superheated water vapor of a specific temperature and a pressure (for example, 495 degrees centigrade and 80 kPa). The superheated water vapor generated is supplied to the steam turbine (60). The steam turbine (60) expands the superheated water vapor supplied to generate driving force. The compressor (30) is rotationally driven by driving force generated by the steam turbine (60) and by driving force generated by the electric motor (32).

Both water vapor whose pressure has been increased in the compressor (30) and water vapor which has been expanded in the steam turbine (60) are delivered into the water vapor space (53) of the air humidifying section (50). A part of the water vapor introduced into the water vapor space (53), after passing through the water vapor permeable membrane (51), migrates into the air space (52). By this movement of the water vapor, the to-be-heated air introduced into the air space (52) of the air humidifying section (50) is humidified. The remaining water vapor in the water vapor space (53) is delivered to the heat radiating side passageway (42) of the main heat exchanger (40).

In the main heat exchanger (40), the to-be-heated air in the heat absorbing side passageway (41) and the water vapor in the heat radiating side passageway (42) exchange heat. As a result, heat of condensation is liberated when the water vapor is caused to condense in the heat radiating side passageway (42), and the to-be-heated air in the heat absorbing side passageway (41) is heated by this condensation heat. That is, the to-be-heated air in the state of Point D undergoes an increase in temperature by heating in the main heat exchanger (40) as well as an increase in humidity by humidification in the air humidifying section (50), thereby entering the state of Point E. The to-be-heated air in the state of Point E is supplied indoors through the utilization system (13). This supply of the to-be-heated air provides heating.

Condensation water generated by condensation of the water vapor in the heat radiating side passageway (42) of the main heat exchanger (40) is delivered into the water side space (78) of the pre-humidifying section (75). A part of the condensation water introduced into the water side space (78), after passing through the moisture permeable membrane (76), is supplied to the heat source air in the air space (77). That is, the condensation water generated in the main heat exchanger (40) is in a certain high temperature state (for example, about 40 to about 50 degrees centigrade), so that heat held in the condensation water is collected, as water vapor's latent heat, in the heat source air. The remaining condensation water, which has flowed out of the water side space (78) of the pre-humidifying section (75), is thereafter discharged outdoors.

Effects of the Seventh Embodiment

In the seventh embodiment, in the pre-humidifying section (75) condensation water is utilized to humidify the heat source air. Accordingly, heat held in the condensation water is collected, as water vapor's latent heat, in the heat source air. This makes it possible to make effective utilization of energy.

Further, in accordance with the seventh embodiment, a heat source fluid, the water vapor partial pressure of which has been raised by humidification in the pre-humidifying section (75), can be introduced into the water vapor separating section (20). Because of this, while maintaining a difference in water vapor pressure between the spaces divided by the water vapor permeable membrane (21), the pressure of the post-separation water vapor can be set high. Accordingly, if the pressure of water vapor after its pressure was increased in the compressor (30) is constant, this makes it possible to reduce the ratio of increasing pressure in the compressor (30). As a result, power necessary for driving the compressor (30) can be reduced, thereby making it possible to provide improved efficiency.

EMBODIMENT 8

An eighth embodiment of the present invention differs from the seventh embodiment in that not only heating but also cooling can be provided. Hereinafter, different arrangements from the seventh embodiment will be described. Exemplary modifications applicable to the seventh embodiment can be applied also to the eighth embodiment.

Figure 12:
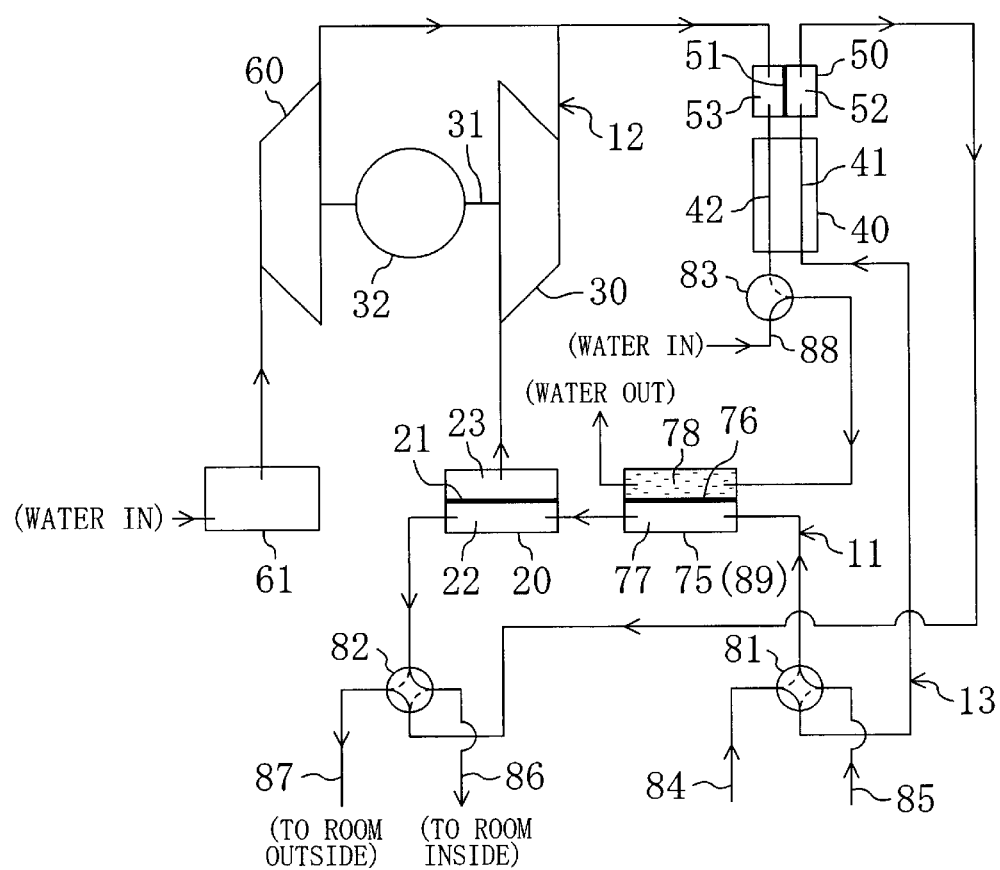
FIG. 12 is a schematic arrangement diagram of a heat pump according to an eighth embodiment of the present invention.

As shown in FIG. 12, the heat pump of the eighth embodiment is provided with a first four-way selector valve (81), a second four-way selector valve (82), and a selector valve (83).

Connected to the first four-way selector valve (81) are an inlet end of the heat source system (11) and an inlet end of the utilization system (13). Further, a first air passage (84) for the taking in of air of a first type and a second air passage (85) for the taking in of air of a second type are connected to the first four-way selector valve (81). The first four-way selector valve (81) is so constructed as to provide switching between a state (as indicated with broken lines in FIG. 12) in which the heat source system (11) and the first air passage (84) are in communication with each other and, in addition, the utilization system (13) and the second air passage (85) are in communication with each other, and a state (as indicated with solid lines in FIG. 12) in which the heat source system (11) and the second air passage (85) are in communication with each other and, in addition, the utilization system (13) and the first air passage (84) are in communication with each other.

Connected to the second four-way selector valve (82) are an outlet end of the heat source system (11) and an outlet end of the utilization system (13). Further, an indoor supplying passage (86) which opens to the inside of the room and an outdoor discharging passage (87) which opens to the outside of the room are connected to the second four-way selector valve (82). The second four-way selector valve (82) is so constructed as to provide switching between a state (as indicated with broken lines in FIG. 12) in which the heat source system (11) and the outdoor discharging passage (87) are in communication with each other and, in addition, the utilization system (13) and the indoor supplying passage (86) are in communication with each other, and a state (as indicated with solid lines in FIG. 12) in which the heat source system (11) and the indoor supplying passage (86) are in communication with each other and, in addition, the utilization system (13) and the outdoor discharging passage (87) are in communication with each other.

The first type air is composed of a mixture of ventilation exhaust air that is discharged from the room for ventilation and outdoor air. On the other hand, the second type air is composed of a mixture of introduced outside air that is introduced indoors for ventilation and indoor air.

The selector valve (83) is interposed between the main heat exchanger (40) and the pre-humidifying section (75) in the cycle system (12). A water supplying passage (88) for supplying for example tap water is connected to the selector valve (83). The selector valve (83) is so constructed as to provide switching between a state (as indicated with broken lines in FIG. 12) in which the heat radiating side passageway (42) of the main heat exchanger (40) and the water side space (78) of the pre-humidifying section (75) are in communication with each other, and a state (as indicated with solid lines in FIG. 12) in which the water supplying passage (88) and the water side space (78) of the pre-humidifying section (75) are in communication with each other.

Further, the pre-humidifying section (75) of the eighth embodiment constitutes a pre-humidifying means (75) for humidifying the first type air by use of condensation water from the main heat exchanger (40) and, at the same time, constitutes a humidification cooling means (89) for humidifying and cooling the first type air by use of water from the water supplying passage (88).

Running Operation

First, the operation during the heating mode will be described. During the heating mode operation, the first four-way selector valve (81), the second four-way selector valve (82), and the selector valve (83) are all switched to their respective broken-line states (see FIG. 12). In this condition, the heating mode operation is carried out in the same way as in the seventh embodiment, for providing room heating.

More specifically, the first type air taken in the first air passage (84) is delivered, as heat source air, to the heat source system (11). The first type air delivered to the heat source system (11) is humidified in the pre-humidifying section (75) and thereafter its water vapor content is separated in the water vapor separating section (20). Then, the first type air is discharged outdoors through the outdoor discharging passage (87). The water vapor, separated from the first type air in the water vapor separating section (20), is compressed in the compressor (30). On the other hand, the water vapor delivered to the steam turbine (60) from the boiler (61) is utilized to generate driving force.

Both the water vapor from the compressor (30) and the water vapor from the steam turbine (60) are delivered to the air humidifying section (50) and a part of the water vapor delivered to the air humidifying section (50) passes through the water vapor permeable membrane (51). The remaining water vapor is delivered to the main heat exchanger (40) where it is caused to condense. This condensation water generated in the main heat exchanger (40) is delivered to the pre-humidifying section (75) serving as the pre-humidifying means (75) and a part of the condensation water delivered to the pre-humidifying section (75) is utilized to humidify the first type air. The remaining condensation water is discharged outdoors.

Meanwhile, the second type air, taken in the second air passage (85), is delivered, as air to be heated, to the utilization system (13). The second type air delivered to the utilization system (13) is first heated in the main heat exchanger (40) and then humidified in the air humidifying section (50). Thereafter, the second type air is supplied to inside the room through the indoor supplying passage (86). This supply of the second type air provides room heating.

Next, the operation during the cooling mode will be described. During the cooling mode operation, the first four-way selector valve (81), the second four-way selector valve (82), and the selector valve (83) are all switched to their respective solid-line states (see FIG. 12).

In this condition, the second type air taken in the second air passage (85) is delivered to the heat source system (11). The second type air delivered into the heat source system (11) is introduced to the air space (77) in the pre-humidifying section (75) serving as the humidification cooling means (89). Further, the water side space (78) of the pre-humidifying section (75) is fed tap water from the water supplying passage (88). In the pre-humidifying section (75), the water in the water side space (78) is supplied to the second type air in the air space (77), and the second type air is cooled by humidification.

The second type air cooled in the pre-humidifying section (75) is delivered into the water vapor space (23) of the water vapor separating section (20) where its water vapor content is separated from the second type air and, as a result, the second type air is dehumidified to a specific humidity. Thereafter, the second type air is supplied to inside the room through the indoor supplying passage (86). This supply of the second type air provides room cooling.

The water vapor separated from the first type air in the water vapor separating section (20) is compressed in the compressor (30). Further, the water vapor delivered from the boiler (61) to the steam turbine (60) is utilized to generate driving force. Both water vapor from the compressor (30) and water vapor from the steam turbine (60) are delivered into the water vapor space (53) of the air humidifying section (50). A part of the water vapor introduced into the water vapor space (53) passes through the water vapor permeable membrane (51), whereas the remaining water vapor is delivered to the heat radiating side passageway (42) of the main heat exchanger (40). In the heat radiating side passageway (42), the remaining water vapor exchanges heat with the first type air in the heat absorbing side passageway (41) where it condenses. This condensation water generated by such condensation is thereafter discharged outdoors.

Meanwhile, the first type air taken in the first air passage (84) is delivered to the utilization system (13). The first type air delivered to the utilization system (13) is introduced to the heat absorbing side passageway (41) of the main heat exchanger (40). In the heat absorbing side passageway (41), the first type air exchanges heat with water vapor in the heat radiating side passageway (42) and absorbs heat of condensation of the water vapor. The first type air, which has absorbed the condensation heat, is delivered to the air space (52) of the air humidifying section (50). In this air space (52), the water vapor, which has passed through the water vapor permeable membrane (51), is supplied to the first type air. The first air, which has received the water vapor in the air space (52) of the air humidifying section (50), is thereafter discharged outdoors through the outdoor discharging passage (87).

Other Embodiments

Exemplary Modification 1

Figure 13:
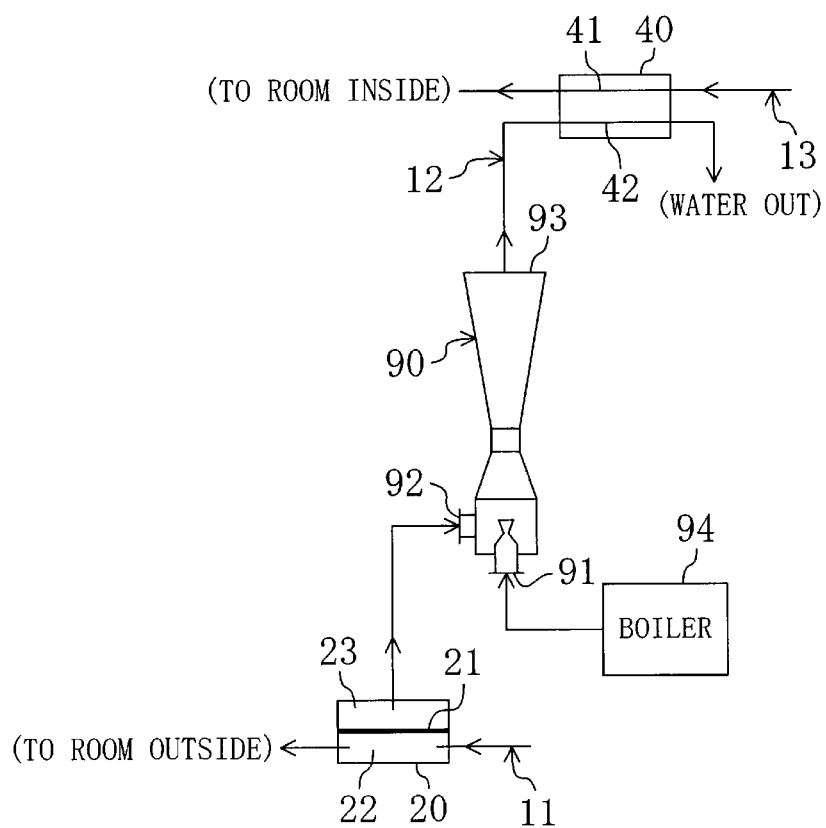
FIG. 13 is a schematic arrangement diagram of a heat pump according to a first exemplary modification of another embodiment of the present invention.

This first exemplary modification is an exemplary modification which differs from the foregoing embodiments. That is, instead of using the compressor (30), an ejector (90) is provided as a pressure increasing means. With the provision of the ejector (90), a boiler (94) is provided as a water vapor supplying means. Referring to FIG. 13, the first exemplary modification will be described below. FIG. 13 shows an example in which the pressure increasing means according to the present exemplary modification is applied to the first embodiment (see FIG. 1).

The boiler (94) is constructed so as to generate water vapor by heating water. The water vapor generated in the boiler (94) is supplied to the ejector (90).

The ejector (90) is shaped like a pipe. An inlet opening (91) is formed in an end surface on one end side of the ejector (90) and a suction opening (92) is formed in a side thereof. In the ejector (90), an outlet opening (93) opens in the other end surface. The ejector (90) is shaped such that its diameter becomes smaller from one end toward the other and then becomes greater.

In the ejector (90), the inlet opening (91) is connected to the boiler (94); the suction opening (92) is connected to the water vapor space (23) of the water vapor separating section (20); and the outlet opening (93) is connected to the heat radiating side passageway (42) of the main heat exchanger (40). The ejector (90) jets water vapor delivered through the inlet opening (91) at high speed and draws in water vapor through the suction opening (92) by such a jet stream. Further, in the ejector (90), water vapor drawn from the water vapor space (23) of the water vapor separating section (20) and water vapor supplied from the boiler (94) merge together, and the merged water vapor is delivered, through the outlet opening (93), to the heat radiating side passageway (42) of the main heat exchanger (40). That is, the pressure of the water vapor that is delivered from the ejector (90) to the heat radiating side passageway (42) is higher than the pressure of the water vapor in the water vapor space (23) of the water vapor separating section (20).

By virtue of the above-described arrangement, it becomes possible to increase the pressure of water vapor without performing mechanical operations such as rotational movement. This accordingly provides improvement in heat pump reliability.

Exemplary Modification 2

In each of the foregoing embodiments, the heat source air is composed of a mixture of outdoor air and ventilation exhaust air for ventilation. Alternatively, the heat source air may be composed of ventilation exhaust air alone or of outdoor air alone.

Further, in each of the foregoing embodiments, the heat source air is used as a heat source fluid. Alternatively, combustion exhaust gases containing water vapor may be used as a heat source fluid. That is, combustion of a fuel in a gas turbine, an engine, or the like results in the exhaustion of a combustion exhaust gas containing a large amount of water vapor. This combustion exhaust gas is not discarded directly but is used as a heat source fluid to operate the heat pump. This achieves effective utilization of energy held in combustion exhaust gases.

Exemplary Modification 3

In each of the first, third, fourth, sixth, seventh, and eighth embodiments, the air to be heated is composed of a mixture of indoor air and introduced outside air for ventilation. Alternatively, the air to be heated may be composed of introduced outside air alone or of indoor air alone.

INDUSTRIAL APPLICABILITY

As described above, the heat pumps of the present invention are useful for air conditioning machines. Especially, the heat pumps of the present invention are suitable for air conditioning machines making utilization of water vapor's condensation heat as hot heat.

What is claimed is:

1. A heat pump comprising:
   separating means (20) for separating water vapor from a water vapor containing heat source fluid,
   pressure increasing means (30, 90) for increasing the pressure of said water vapor separated by said separating means (20), and
   hot heat generating means (40, 45) for generating hot heat by causing said water vapor, the pressure of which has been increased by the pressure increasing means (30, 90), to condense.

2. The heat pump of claim 1, said separating means (20) including:
   a water vapor permeable membrane (21),
   whereby water vapor contained in a heat source fluid will pass through said water vapor permeable membrane (21), thereby being separated from said heat source fluid.

3. The heat pump of either claim 1 or claim 2, wherein said heat source fluid comprises a combustion exhaust gas discharged after utilizing combustion energy of a fuel.

4. The heat pump of either claim 1 or claim 2, wherein said heat source fluid comprises moist air.

5. The heat pump of claim 4 further comprising pre-humidifying means (75) for humidifying a heat source fluid by supplying condensation water produced in said hot heat generating means (40, 45) to said heat source fluid, and for delivering said humidified heat source fluid to said separating means (20).

6. The heat pump of claim 4 further comprising preheating means (70) for heating a heat source fluid by causing condensation water produced in said hot heat generating means (40, 45) to exchange heat with said heat source fluid, and for delivering said heated heat source fluid to said separating means (20).

7. The heat pump of either claim 1 or claim 2, wherein said hot heat generating means (45) is so constructed as to heat water by hot heat generated therein.

8. The heat pump of either claim 1 or claim 2, wherein said hot heat generating means (40) is so constructed as to heat to-be-heated air by hot heat generated therein.

9. The heat pump of claim 8 further comprising air humidifying means (55) for humidifying to-be-heated air by supplying condensation water produced in said hot heat generating means (40) to said to-be-heated air.

10. The heat pump of claim 8 further comprising air humidifying means (50) for humidifying to-be-heated air by supplying a part of said water vapor whose pressure has been increased in said pressure increasing means (30, 90) to said to-be-heated air.

11. The heat pump of claim 10, said air humidifying means (50) including:
   a water vapor permeable membrane (51),
   whereby water vapor will pass through said water vapor permeable membrane (51), thereby being supplied to to-be-heated air.

12. The heat pump of either claim 1 or claim 2, wherein said pressure increasing means is formed by an ejector (90) for drawing in said water vapor separated in said separating means (20) by jetting water vapor supplied from water vapor supplying means (94).

13. The heat pump of either claim 1 or claim 2, wherein said pressure increasing means is formed by a compressor (30) for compressing water vapor to an increased pressure.

14. The heat pump of claim 13, wherein said compressor (30) is driven by a steam turbine (60) capable of generating driving force upon receipt of water vapor supplied from water vapor supplying means (61).

15. The heat pump of claim 13, wherein said compressor (30) is driven both by a steam turbine (60) capable of producing driving force upon receipt of water vapor supplied from water vapor supplying means (61) and by an electric motor (32).

16. The heat pump of either claim 14 or claim 15, wherein said water vapor supplying means (61) is formed by a boiler (61) capable of generating superheated water vapor by heating water.

17. The heat pump of claim 16, wherein said boiler (61) comprises a latent heat section (62) for evaporating water by making utilization of waste heat, and a sensible heat section (63) for generating superheated water vapor by heating water vapor generated by said latent heat section (62).

18. The heat pump of either claim 16 or claim 17, wherein the internal pressure of said boiler (61) is set below atmospheric pressure.

19. The heat pump of either claim 14 or claim 15, wherein said hot heat generating means (40, 45) is so constructed as to be fed water vapor expanded in said steam turbine (60) and to generate hot heat by causing said water vapor to condense.

20. The heat pump of either claim 1 or claim 2 further comprising:
   humidification cooling means (89) for cooling a heat source fluid by humidification and thereafter delivering said cooled heat source fluid to said separating means (20),
   wherein said heat pump is so constructed as to perform a cooling operation which makes utilization of a heat source fluid from which water vapor has been separated in said separating means (20) and a heating operation for heating an object by making utilization of hot heat produced in said hot heat generating means (40, 45).

* * * * *

UNITED STATES PATENT AND TRADEMARK OFFICE
CERTIFICATE OF CORRECTION

PATENT NO. : 6,708,517 B1  Page 1 of 1
DATED : March 23, 2004
INVENTOR(S) : Chun-cheng Piao et al.

It is certified that error appears in the above-identified patent and that said Letters Patent is hereby corrected as shown below:

<u>Title page,</u>
Item [75], Inventors, delete "Sakai" each time it occurs and add -- Osaka --.

Signed and Sealed this

Thirty-first Day of August, 2004

JON W. DUDAS
*Director of the United States Patent and Trademark Office*